United States Patent
Lehmann et al.

(10) Patent No.: US 10,616,186 B2
(45) Date of Patent: *Apr. 7, 2020

(54) DATA TOKENIZATION

(71) Applicant: International Business Machines Corporation, Armonk, NY (US)

(72) Inventors: Anja Lehmann, Zürich (CH); Marcus B. Oestreicher, Zürich (CH); Michael C. Osborne, Richterswil (CH)

( * ) Notice: Subject to any disclaimer, the term of this patent is extended or adjusted under 35 U.S.C. 154(b) by 69 days.

This patent is subject to a terminal disclaimer.

(21) Appl. No.: 15/488,304

(22) Filed: Apr. 14, 2017

(65) Prior Publication Data

US 2018/0302380 A1 Oct. 18, 2018

(51) Int. Cl.
*G06F 21/00* (2013.01)
*H04L 29/06* (2006.01)
*H04W 12/02* (2009.01)
*G06F 21/62* (2013.01)

(52) U.S. Cl.
CPC ...... *H04L 63/0428* (2013.01); *G06F 21/6209* (2013.01); *G06F 21/6254* (2013.01); *H04L 63/0414* (2013.01); *H04L 63/06* (2013.01); *H04L 63/062* (2013.01); *H04W 12/02* (2013.01)

(58) Field of Classification Search
CPC .. H04L 63/06; H04L 63/0428; G06F 21/6209
USPC ....................................................... 713/153
See application file for complete search history.

(56) References Cited

U.S. PATENT DOCUMENTS

| | | | | |
|---|---|---|---|---|
| 7,412,541 | B1* | 8/2008 | Stadler | H04L 69/04 379/900 |
| 9,202,086 | B1 | 12/2015 | Mattsson | |
| 2005/0066174 | A1* | 3/2005 | Perlman | H04L 9/3006 713/176 |
| 2011/0154467 | A1* | 6/2011 | Bomar | G06F 21/335 726/9 |
| 2012/0303503 | A1 | 11/2012 | Cambridge | |
| 2012/0304273 | A1* | 11/2012 | Bailey | H04L 9/0891 726/9 |

(Continued)

OTHER PUBLICATIONS

Anja Lehmann, et al., unpublished U.S. Appl. No. 15/858,994 filed Dec. 29, 2017, Data Tokenization, pp. 1-21 plus 5 sheets of drawings.

(Continued)

*Primary Examiner* — Mohammad W Reza
*Assistant Examiner* — Kevin Ayala (57) ABSTRACT

A data-source computer provides message data, having associated id data, to be sent to a data-collection computer; produces a blinded id by blinding the id data using a nonce; sends the blinded id to a tokenization computer; and sends the nonce and the message data via a network for receipt by the data-collection computer. In response, the tokenization computer produces a blinded token comprising a function, blinded with the nonce, of the id data and a secret key of the tokenization computer, and sends the blinded token to the data-collection computer. The data-collection computer, in response, uses the nonce to unblind the blinded token to obtain an id token which comprises a deterministic function of the id data and the secret key. The data-collection computer then stores the id token and the message data in storage operatively coupled to the data-collection computer.

8 Claims, 5 Drawing Sheets

(56) References Cited

U.S. PATENT DOCUMENTS

| | | |
|---|---|---|
| 2013/0013507 A1 | 1/2013 | Browning et al. |
| 2013/0047195 A1 | 2/2013 | Radhakrishnan et al. |
| 2015/0096039 A1 | 4/2015 | Mattsson |
| 2015/0341322 A1* | 11/2015 | Levi .................. G06Q 30/0269 726/26 |
| 2016/0019396 A1 | 1/2016 | Davis et al. |
| 2016/0085720 A1 | 3/2016 | Abali et al. |
| 2016/0085971 A1 | 3/2016 | Saxena |
| 2017/0214521 A1* | 7/2017 | Busch .................. H04L 9/0618 |

OTHER PUBLICATIONS

Paul J. Otterstedt, List of IBM Patents or Patent Applications Treated as Related, May 8, 2018, pp. 1-2.

K. S. Pawar et al. "Information Security in a Cloud Using Trusted Third Party". International Journal of Advanced Research in Computer Science and Software Engineering. vol. 6, Issue 5, May 2016. pp. 600-603.

Noopur Katre et al. "Trusted Third Party for Data Security in Cloud Environment". Advances in Electrical, Electronics, Information, Communication and Bio-Informatics (AEEICB), 2016 2nd International Conference on Feb. 27-28, 2016, abstract only pp. 1-3.

\* cited by examiner

DATA TOKENIZATION

BACKGROUND

The present invention relates generally to data tokenization.

Data tokenization is a technique used to desensitize data when the data is to be moved to a less-trusted environment. When data sets are outsourced, for example, or data, such as transaction data, is collected or aggregated for some purpose, legal constraints or security concerns often dictate the use of tokenization techniques before moving the data across borders or into untrusted environments. In particular, data to be transmitted over a network may include identifying information, such as social security numbers, bank account numbers, vehicle identification numbers or other unique identifiers which should not be revealed by the data provider. Such id data is therefore replaced by other, typically random-looking, data (the token). To preserve utility of the data as a whole, referential integrity must be maintained by the tokenization process. That is, the tokenization operation must be a deterministic process so that all occurrences of the same id data are consistently replaced by the same token.

A number of tokenization techniques have been proposed and are in commercial operation today. Typical approaches either rely on non-cryptographic methods such as substitution, perturbation or conversion tables, or use cryptographic mechanisms such as keyed hash-functions or deterministic encryption. What all approaches have in common is that they require the tokenization operation to be performed in a trusted environment, i.e., by the trusted data source itself or by a dedicated entity within the trust domain of the data source. This imposes constraints on implementation of tokenization systems. Moreover, this assumption is difficult to realize in a secure and efficient manner when data is collected from different, possibly widely-distributed data sources. Referential integrity requires tokenization operations to be consistent across all data sources, so all sources must share the same secret tokenization key or, even worse, must keep a shared and consistent version of a conversion table. A more practical approach is to concentrate the tokenization task at a central trusted entity, or TTP (trusted third party), which handles all tokenization requests. The TTP then provides a service that transforms the sensitive id data into a secure token. Current solutions require disclosure of the id data to the TTP, which makes the TTP a security and privacy bottleneck. For example, when tokenization is performed in a dynamic way in response to multiple requests and/or for multiple sources, having a single entity that can recognize and track the activities of users or other entities corresponding to the id data is clearly not desirable.

SUMMARY

According to at least one embodiment of the present invention there is provided a data tokenization system comprising a data-source computer, a tokenization computer and a data-collection computer adapted for communication via a network. The data-source computer provides message data, having associated id data, to be sent to the data-collection computer and is adapted to produce a blinded id by blinding the id data using a nonce. The data-source computer is further adapted to send the blinded id to the tokenization computer, and to send the nonce and the message data via the network for receipt by the data-collection computer. The tokenization computer is adapted, in response to receipt of the blinded id, to produce therefrom a blinded token comprising a function, blinded with said nonce, of said id data and a secret key of the tokenization computer, and to send the blinded token to the data-collection computer. The data-collection computer is adapted, in response to receipt of the blinded token from the tokenization computer and of the nonce and the message data sent by the data-source computer, to use the nonce to unblind the blinded token to obtain an id token which comprises a deterministic function of the id data and the secret key. The data-collection computer then stores the id token and the message data in storage operatively coupled to the data-collection computer.

In embodiments of the invention, an id token for the sensitive id data which is associated with other data (referred to generally herein as "message data") to be sent to a data-collection computer can be generated securely in an untrusted domain. The tokenization computer provides a centralized tokenization point but performs its tokenization operation in an oblivious manner. It does not learn any information about the id data that is tokenized nor about the blindly computed id token. Moreover, the tokenization computer cannot even determine whether two token requests are for the same id data or not. This prevents tracking of activities by linking requests for a given id, and thus prevents interference attacks which aim to exploit the linkability of events. Similarly, the data-collection computer does not learn anything about the id data that is tokenized, and the data source does not learn anything about the resulting token. Embodiments of the invention thus provide secure and eminently practical data tokenization systems.

Systems embodying the invention can readily accommodate more than one data-source computer each of which is adapted to communicate with the tokenization computer and data-collection computer as described above. There is no need to synchronize a tokenization key or other secure tokenization information across multiple data sources since the secure tokenization operation is performed centrally, in an oblivious manner, to provide deterministic tokens for all sources.

In an efficient implementation of preferred embodiments, the data-source computer is adapted such that the blinded id comprises a value $R=F(N, h)$ where $F$ is a predetermined function, $N$ is the nonce and $h$ is a function of the id data. The tokenization computer is adapted such that the blinded token comprises a value $R'=F(k, R)$ where $k$ is the secret key. The data-collection computer is adapted such that the id token comprises a value $F(n, R')$ where $n$ is a function of the nonce $N$. Here, the predetermined function $F$ is such that $F(n, R')=F'(k, h)$ where $F'$ is the aforementioned deterministic function. In a particularly efficient implementation, the predetermined function $F$ is such that $F(x, y)=)=y^x$ and the function $n$ comprises a value $N^{-1}$. This also allows use of a simple and efficient key-update procedure. The tokenization computer can be further adapted to periodically generate a new secret key $k'$, to produce token-update data $\Delta$, comprising a value $k'/k$, and to send the token-update data $\Delta$ to the data-collection computer. In response to receipt of the token-update data $\Delta$, the data-collection computer can simply replace the id token (denoted by tok) in its associated storage by an updated token which comprises a value $tok^\Delta$. In this way, the secure tokenization key can be refreshed as required while maintaining referential integrity between new tokens, generated under the new key $k'$, and previously-stored tokens generated under the old key $k$.

Respective further embodiments of the invention provide methods performed by a data-source computer, a tokenization computer, and a data-collection computer of a data tokenization system as described above.

Embodiments of the invention will be described in more detail below, by way of illustrative and non-limiting example, with reference to the accompanying drawings.

DETAILED DESCRIPTION

Figure 1:
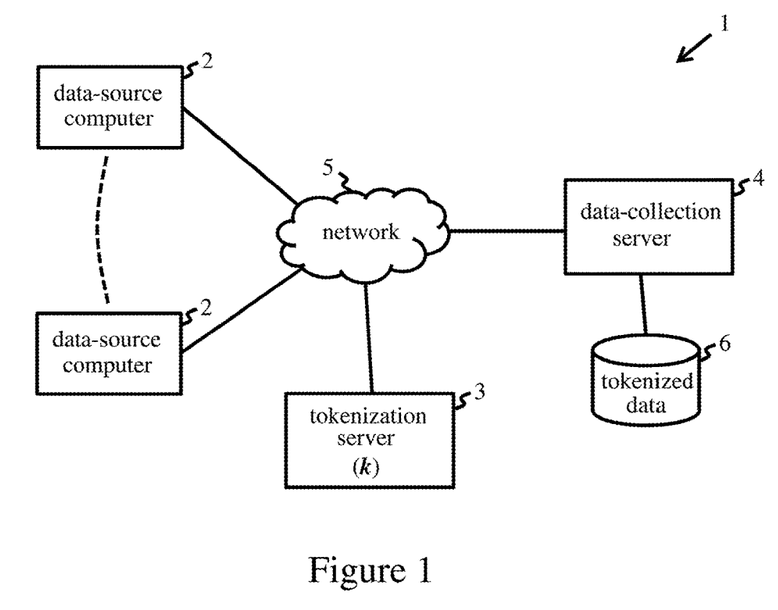
FIG. 1 is a schematic representation of a data tokenization system embodying the invention.

The block diagram of FIG. 1 shows an exemplary tokenization system embodying the invention. The system 1 comprises a plurality of data-source computers 2, a tokenization computer, implemented here by server 3, and a data-collection computer implemented here by server 4. The data-source computers 2, tokenization server 3 and data-collection server 4 are adapted for communication via a network 5, where network 5 may in general comprise one or more component networks and/or internetworks including the Internet.

In operation of system 1, data-collection (DC) server 4 collects data supplied over network 5 by data-source (DS) computers 2. The tokenization server 3 provides a tokenization service to the DS computers 2 in this process. In particular, data to be sent by a DS computer 2 at any given time can be represented as a tuple $(uid_i, m)$ where $uid_i$ represents the security-sensitive id data which should not be revealed to the DC server, and m represents the other, accompanying data (the "message data") associated with the id data $uid_i$. A data tuple $(uid_i, m)$ provided at a DS computer 2 may comprise data generated dynamically at the DS computer, e.g. in a transaction operation, and/or data stored in storage operatively coupled to the DS computer, e.g. local storage in DS computer 2 or storage otherwise accessible to the DS computer. Data supplied by DS computers 2, and collected by DC server 4, may be associated with multiple identifiers $uid_i=1, 2, 3, \ldots$, each of which must be consistently tokenized via the tokenization process. The tokenization operation performed by tokenization server 3 uses a cryptographic key k which is secret to the tokenization server. The final id token, denoted by $tok_i$, for the $uid_i$ in a data tuple $(uid_i, m)$ is derived at DC server 4 pursuant to a process detailed below. The DC server stores the resulting tokenized data $(tok_i, m)$ in storage, represented here by database 6, operatively coupled to DC server 4. Data storage 6 may in general comprise any convenient data storage apparatus including one or more data storage media. Typical implementations comprise disk storage apparatus comprising one or more disks, such as magnetic or optical disks, which may be internal to a computer, e.g. in a hard disk drive, or provided by externally-accessible disk apparatus, e.g. in a disk drive array such as a RAID (redundant array of independent disks) array.

Typical application scenarios for the tokenization operation include collecting/aggregating transaction data from banks, shops, etc., collecting vehicle use/performance data from a vehicle pool, collecting web-browsing data from user devices, and so on. Depending on the application scenario, a DS computer 2 may be implemented, for example, by a user computer such as a desktop computer, laptop computer, tablet, notebook, palmtop, mobile phone, PDA (personal digital assistant), personal music player, etc., or by a computer in a vehicle or at a bank, shop or other entity whose data is to be collected.

In general, a computer 2, 3, 4 of system 1 may be implemented by a general- or special-purpose computer, which may comprise one or more (real or virtual) machines, providing functionality for implementing the operations described herein. This functionality may be provided by logic implemented in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices. In particular, functionality of tokenization server 3 can be conveniently implemented as a service in a cloud computing environment. DC server 4 may be operated entirely by a proprietary entity collecting data from multiple sources, or may be wholly or partly implemented as a service in a cloud computing environment. For example, DC server 4 may utilize cloud-based storage for database 6.

Figure 2:
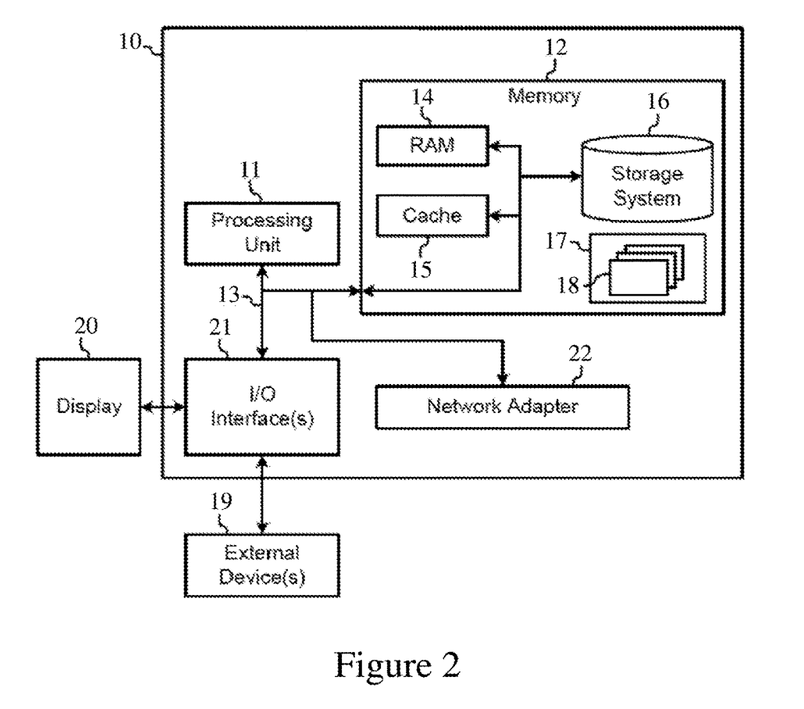
FIG. 2 is a generalized schematic of a computer in the FIG. 1 system.

The block diagram of FIG. 2 shows an exemplary computing apparatus for implementing a computer 2, 3 of system 1. The apparatus is shown here in the form of a general-purpose computing device 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

Figure 3A:
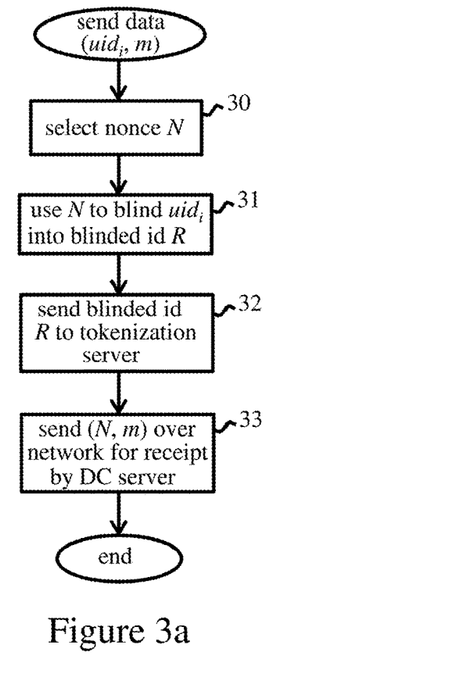
FIGS. 3a through 3c indicate steps performed in system 1 in a data tokenization operation.
Figure 3B:
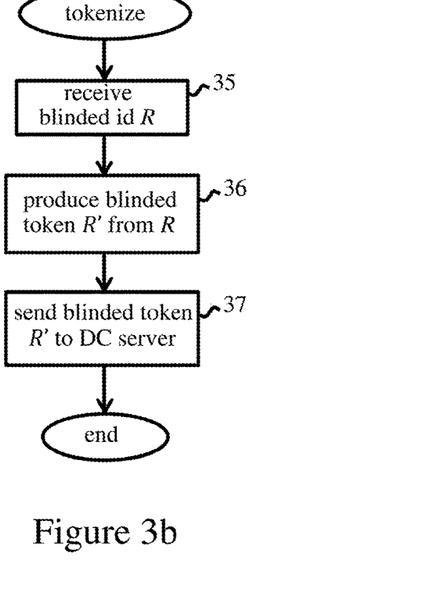
Figure 3C:
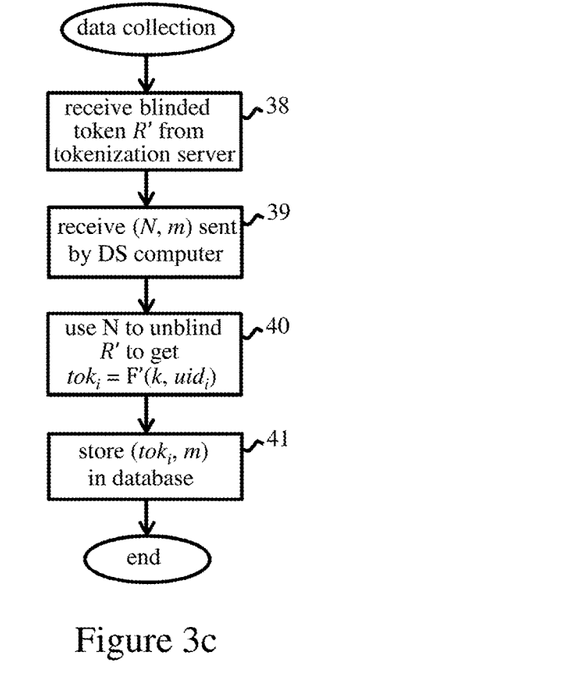

FIGS. 3*a* through 3*c* indicate basic steps performed in system 1 in a tokenization operation. (In the embodiments to be described, all communications between computers 2, 3, 4 may be encrypted and/or signed in the usual manner using encryption/signature schemes of a standard PKI (Public Key Infrastructure). Such procedures are well-known in the art and details are omitted in the following for simplicity.) The tokenization operation is initiated by a DS computer 2 having data to be sent to DC server 4. FIG. 3*a* indicates steps performed by the DS computer 2 for its data tuple ($uid_i$, m). In step 30, the DS computer selects a nonce N. In step 31, the DS computer produces a blinded id, denoted here by R, by blinding the id data $uid_i$ using nonce N. The blinded id R may be produced here by applying a blinding function to $uid_i$ per se or to a function thereof as illustrated by examples below. In step 32, the DS computer sends a token request, comprising the blinded id R, to tokenization server 3 via network 5. In step 33, the DS computer sends the nonce N and the message data m over network 5 for receipt by the DC server 4. This communication may be made via different channels as illustrated by examples below. The process at DS computer 2 is then complete.

FIG. 3*b* illustrates the tokenization operation at tokenization server 3. The tokenization server receives the blinded id R from DS computer 2 in step 35. In step 36, tokenization server 3 produces a blinded token, denoted here by R', for the id data $uid_i$ from the blinded id R. The blinded token R' comprises a function, blinded with the nonce N, of the id data $uid_i$ and the secret key k of the tokenization server. The tokenization server then sends the blinded token R' to the DC server 4 in step 37, and the process is complete.

FIG. 3*c* illustrates the process of obtaining data at DC server 4. The DC server receives the blinded token R' from tokenization server 3 in step 38. Step 39 represents receipt by DC server 4 of the nonce N and message data m sent by DS computer 2 in step 33 of FIG. 3*a*. In step 40, the DC server uses the nonce N to unblind the blinded token R' to obtain an id token $tok_i$ for the id data $uid_i$. This unblinding operation reverses the blinding by the nonce N. The resulting token $tok_i$ comprises a deterministic function (denoted by F') of the id data $uid_i$ and the secret key k of tokenization server 3. In step 41, the DC server stores the tokenized data, comprising a tuple of the id token $tok_i$ and the message data m, in database 6, and the tokenization operation is complete. The tokenization operation is performed for all data transmissions from DS computers 2, whereby DC server can collect a pool of tokenized data from all sources in database 6.

With the above system, tokenization server 3 can be outside the trust domain of DS computers 2 while providing a secure tokenization service to the DS computers. The tokenization server is trusted only to perform its tokenization operation correctly, and does not learn the id data $uid_i$ or the final id token $tok_i$. It receives only blinded id's R produced using nonces N which are selected by DS computers 2 for each data transmission. Hence, the tokenization server cannot even determine if two token requests are for the same $uid_i$ and so cannot link activities associated with any given identity. The DC server does not learn the $uid_i$ tokenized, and DS computers 2 do not learn the final id tokens $tok_i$. The tokens are generated in a deterministic manner: two token requests for the same $uid_i$ will result in the same token $tok_i$, but only after the unblinding operation at DC server 4. Hence, despite performing the tokenization in a fully blind manner, the required referential integrity is ensured. Only the tokenization server is required to store a protocol-specific key k, providing simple key management. Since DS computers do not need to store a tokenization key or other state for the tokenization protocol, there is no risk associated with distribution of secure state across multiple sources, and the system is readily scalable to large groups of data sources.

Figure 4A:
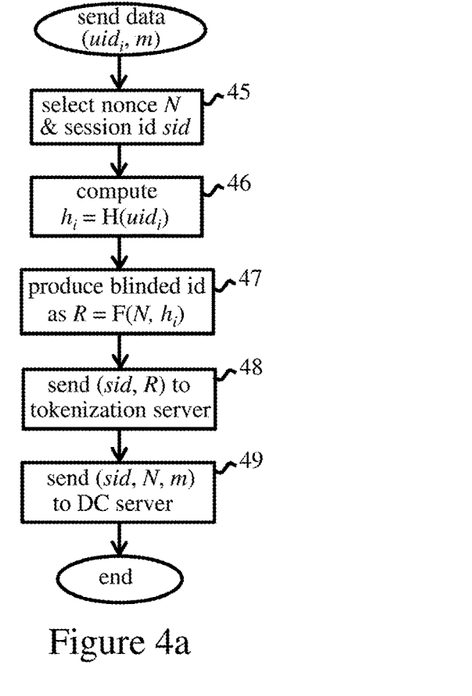
FIGS. 4a through 4c indicate more detailed steps performed in an embodiment of the tokenization system.
Figure 4B:
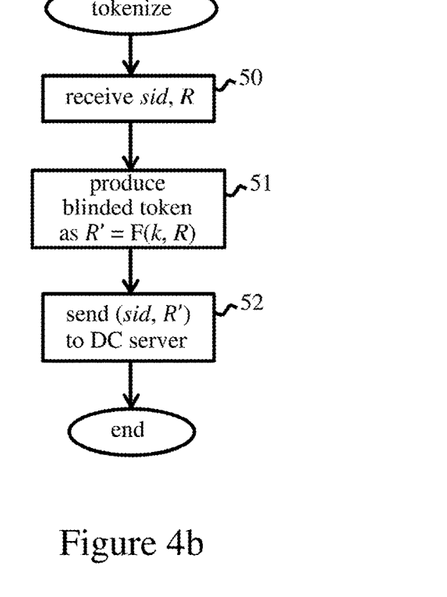
Figure 4C:
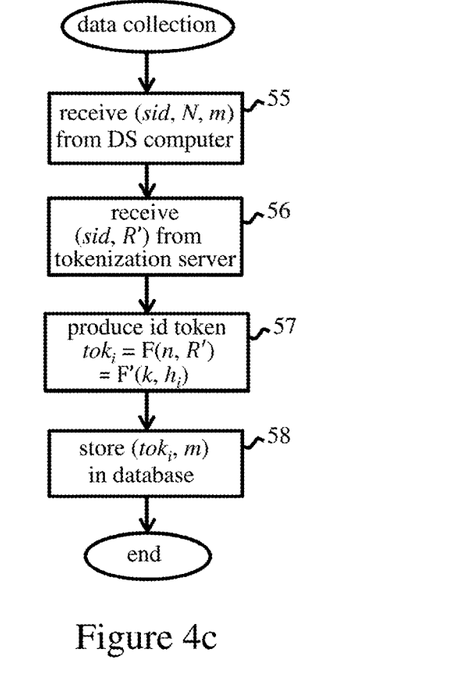

FIGS. 4*a* through 4*c* indicate more detailed steps in an embodiment of the tokenization system. FIG. 4*a* indicates steps performed by a DS computer 2 for a data tuple ($uid_i$, m). In step 45, the DS computer selects a nonce N as before and also a session identifier sid for the data transmission. In step 46, the DS computer applies a hash function H to $uid_i$ to obtain a hash value $h_i$. In step 47, the DS computer produces the blinded id as R=F(N, h) where F is a predetermined function for the tokenization operation. In step 48, the DS computer sends a token request to the tokenization server 3. The token request here comprises the blinded id R as before, and also the session id sid for forwarding by the tokenization server to DC server 4. In step 49, the DS computer sends the session id sid, the nonce N and the message data m to DC server 4, and the process is complete.

FIG. 4*b* indicates steps performed by tokenization server 3. The tokenization server receives (sid, R) from DS computer 2 in step 50. In step 51, tokenization server 3 produces the blinded token as R'=F(k, R). In step 52, the tokenization server sends the blinded token R', with the session identifier sid, to the DC server 4. The process is then complete.

FIG. 4c indicates steps performed by DC server 4. The DC server receives (sid, N, m) from the DS computer in step 55, and (sid, R') from the tokenization server in step 56. On receipt of the two tuples with a matching session identifier sid, operation proceeds to step 57. Here, the DC server computes the id token as $tok_i = F(n, R')$ where n is a function of the nonce N received in step 55. In this embodiment, the predetermined function F used in FIGS. 4a to 4c is chosen such that $F(n, R') = F'(k, h_i)$, where F' is the aforementioned deterministic function. In step 58, the DC server adds $(tok_i, m)$ to the data pool in database 6, and the tokenization operation is complete.

An exemplary implementation of the above scheme, based on the discrete logarithm problem, is described in detail below. In this example, the predetermined function F is such that $F(x, y) = y^x$ and the function n used in step 57 of FIG. 4c is $n = N^{-1}$. The deterministic function $F' = F$. The system parameters consist of a security parameter $\tau$ and a cyclic group $\mathbb{G} = \langle g \rangle$ of order q (which is a $\tau$-bit prime), and the description of a hash function H which maps into $\mathbb{G}$. We assume secure communication channels between all parties, e.g., via SSL/TLS (Secure Sockets Layer/Transport Security Layer) protocols and server certificates. The oblivious tokenization process consists of four procedures as follows.

Setup.

The tokenization server chooses a random secret key $k \xleftarrow{\$} \mathbb{Z}_p$, where $ denotes the random choice and $\mathbb{Z}_p$ is the group of integers modulo p.

Token Request by DS Computer.

A data source with data tuple $(uid_i, m)$ does the following:
1. choose a random session identifier sid;
2. compute blinding $(R, N) \xleftarrow{\$} blind(uid_i)$ by choosing a random nonce $N \xleftarrow{\$} \mathbb{Z}_q$ and computing $R \leftarrow [H(uid_i)]^N$;
3. send token request (sid, R) to the tokenization server, and send (sid, N, m) to the DC server;
4. delete sid, N.

Response at Tokenization Server.

Upon input of a token request (sid, R), the tokenization server does the following:
1. computes $R' \leftarrow R^k$;
2. send a response (sid, R') to the DC server;
3. delete sid, R.

Unblinding & Assembling at DC Server.

Upon receiving (sid, N, m) from a data source and a response (sid, R') from the tokenization server (for the same sid), the DC server does the following:
1. unblind the response into the token $tok_i \xleftarrow{\$} unblind(R', N)$ by computing $tok_i \leftarrow R'^{1/N}$;
2. store output $(tok_i, m)$;
3. delete sid, N, R'.

It can be seen that the final cryptographic token is deterministically derived from $uid_i$ and the secret key k: $tok_i \leftarrow R'^{1/N} = (R^k)^{1/N} = (H(uid_i)^N)^k)^{1/N} = H(uid_i)^k = token(k, uid_i)$. Overall, the parties jointly compute the token with the following security and functional properties.

Oblivious Computation.

The tokenization server operates as an oblivious third party (OTP). The OTP learns neither the incoming identifier $uid_i$ nor the blindly-computed token $tok_i$, and cannot link two requests for the same $uid_i$.

Pseudorandom Tokens.

The blindly produced tokens $tok_i$ are indistinguishable from random for any entity not knowing the secret key k. That is, an adversary getting identifiers $\{uid_i\}$ and tokens $\{tok_i\}$ cannot determine the relation between them. In particular, the data source does not learn anything about the resulting tokens, nor does the data-collector learn anything about the identifiers behind the tokens.

Deterministic Derivation.

The tokens are deterministically derived from the unique identifiers. Thus, even though the input to, and the output from, the OTP is randomized, the final outputs to the data pool are consistent values.

It can be seen that the above provides a highly efficient dynamic data tokenization scheme whereby data can be tokenized "on the fly", providing secure and consistent tokenization for multiple distributed data sources in a large and diverse environment. The oblivious tokenization server blindly computes cryptographically strong tokens without becoming a privacy risk. Moreover, the above scheme can conveniently accommodate a periodic key-update procedure as required for many security-critical applications. The key-update procedure is illustrated in FIG. 5.

Figure 5:
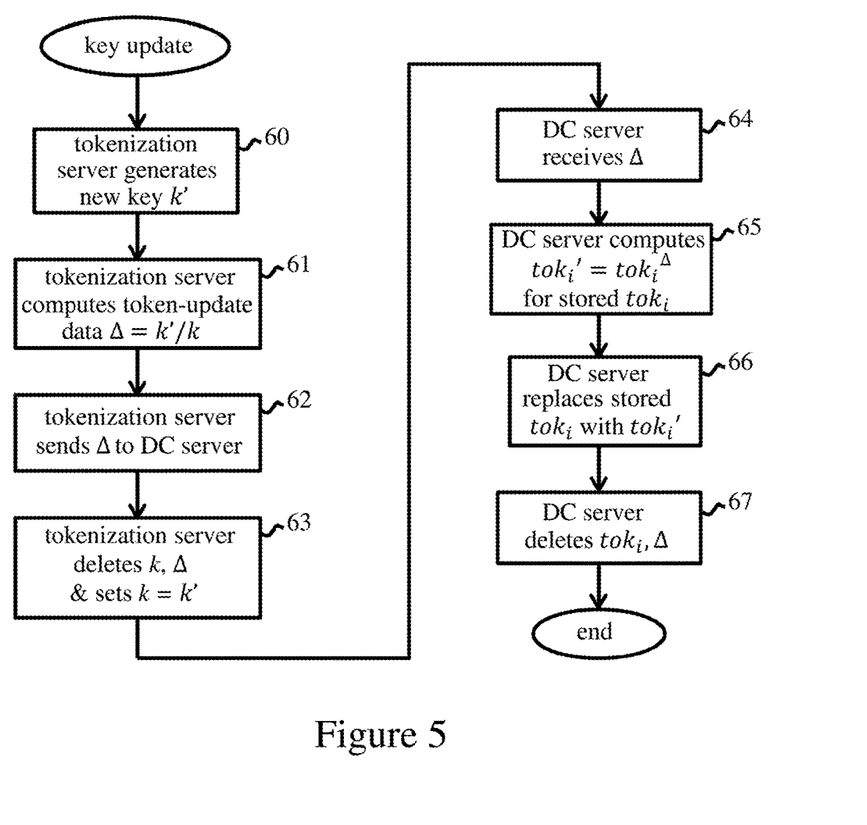
FIG. 5 indicates steps of a key-update procedure performed in an embodiment.

Steps 60 to 63 of FIG. 5 are performed by tokenization server 3. In step 60, the tokenization server generates a new secret key k', here by selecting $k' \xleftarrow{\$} \mathbb{Z}_p$. In step 61, the tokenization server produces token-update data $\Delta$ as $\Delta = k'/k$. The tokenization server sends the token-update data $\Delta$ to DC server 4 in step 62, and then deletes the old key k and the token-update data $\Delta$ in step 63. The new key k' becomes the current tokenization key k and is used for all subsequent token requests from DS computers 2.

Steps 64 to 67 of FIG. 5 are performed by DC server 4. The DC server receives the token-update data $\Delta$ in step 64. In step 65, for each token $tok_i$ stored in database 6, the DC server computes an updated token $tok_i'$ as $tok_i' = tok_i^\Delta$. In step 66, the DC server replaces each old token $tok_i$ by the corresponding updated token $tok_i'$. The DC server deletes all old tokens $tok_i$ and the token-update data $\Delta$ in step 67, and the update process is complete.

The key-update procedure can be performed periodically as required, at regular or irregular intervals, and/or in response to detection of malicious intervention in system 1. Referential integrity is preserved between new tokens, generated under the new key k', and previously-stored tokens generated under the old key k: $tok_i' = tok_i^\Delta = tok_i^{k'/k} = (H(uid_i)^k)^{k'/k} = H(uid_i)^{k'} = token(k', uid_i)$. With every key update, any previously lost or compromised data becomes incompatible with the new key k'. Thus, at any given time, an attacker must both steal data and corrupt the current key used to tokenize that data in order to break security.

Figure 6A:
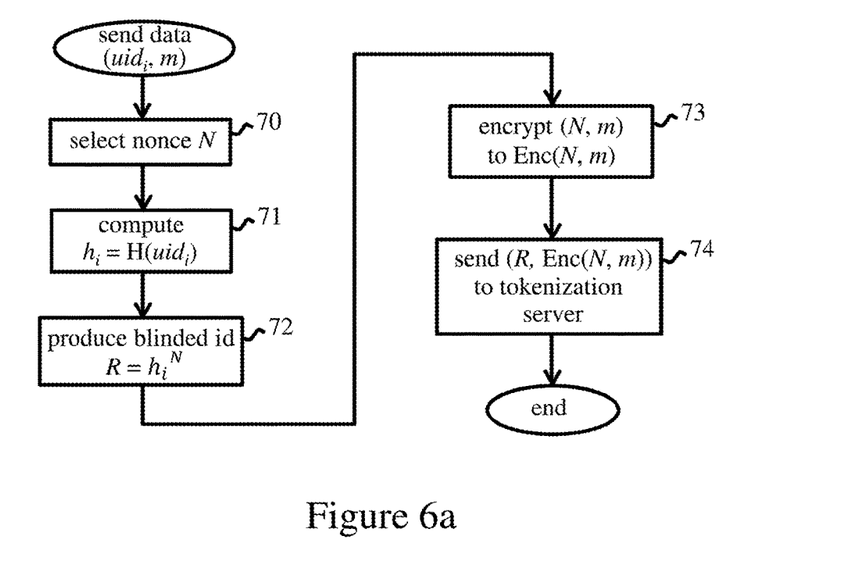
FIGS. 6a through 6c indicate steps performed in a further embodiment of the tokenization system.
Figure 6B:
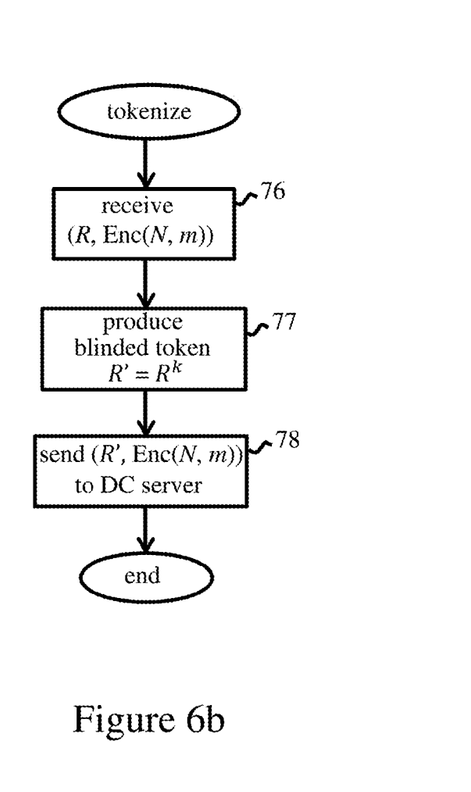
Figure 6C:
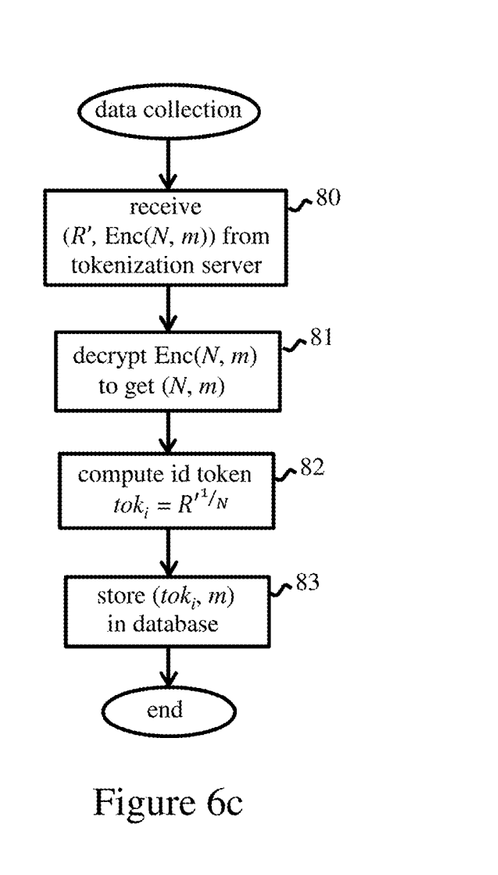

FIGS. 6a through 6c indicate steps of an alternative embodiment which is also based on the discrete logarithm problem. FIG. 6a indicates steps performed by a DS computer 2. In step 70, the DS computer selects a nonce N and in step 71 the DS computer computes a hash value $h_i = H(uid_i)$ as before. In step 72, the DS computer produces the blinded id as $R = h_i^N$. In step 73 here, the DS computer encrypts the message data m and the nonce N via an encryption scheme Enc to produce encrypted data Enc(N, m). Encryption can be performed via a symmetric encryption scheme under a secret key known to DC server 4, or an asymmetric encryption scheme under a public key pk of a public-private key pair (pk, sk), the secret key sk of which is known to the DC server. In step 74, the DS computer sends a token request, containing the encrypted data Enc(N, m) and the blinded id R, to the tokenization computer 3, and the process is complete.

FIG. 6b indicates steps performed by tokenization server 3. The tokenization server receives the token request (R, Enc(N, m)) in step 76. In step 77, tokenization server 3 produces the blinded token as $R' = R^k$. In step 78, the tokenization server sends the blinded token R', with the encrypted data Enc(N, m), to DC server 4, and the process is complete.

FIG. 6c indicates steps performed by DC server 4. The DC server receives (R',Enc(N, m)) from the tokenization server in step 80. In step 81, the DC server decrypts the encrypted data Enc(N, m), using its secret key mentioned above, to recover the message data m and nonce N. In step 82, the DC server computes the id token as $tok_i = R'^{1/N}$. In step 83, the DC server stores ($tok_i$, m) and the tokenization operation is complete.

While the blinded id is computed as the value $R=F(N, h_i)$ above, the blinded id may otherwise comprise a function of the value $R=F(N, h_i)$, e.g. a multiple or power of $F(N, h_i)=h_i^N$, in other embodiments. Similarly, the blinded token, the id token $tok_i$, the function n, the token-update data $\Delta$ and the updated token $tok'_i = tok_i^\Delta$ may comprise a function, such as a multiple or power, of the values specified above as appropriate. Also, systems may be based on predetermined functions F other than $F(x, y)=y^x$. For instance, systems based on multiplication (e.g. $F(x, y)=x \times y$), or division (e.g. $F(x, y)=x/y$) can be readily envisaged.

Respective different functions may be used in computing the blinded id, the blinded token and the id token. One example is provided by the following embodiment. In addition to the secret tokenization key k, the tokenization server 3 in this embodiment holds a public/private key pair (epk, esk) for an additively homomorphic encryption scheme HEnc. Such an encryption scheme has a homomorphic property whereby there exists an efficient operation $\odot$ on ciphertexts $C = HEnc_{epk}(m)$ encrypting a message m under the public key epk such that:

if $C_1 = HEnc_{epk}(m_1)$ and $C_2 = HEnc_{epk}(m_2)$
then $C_1 \odot C_2 = HEnc_{epk}(m_1+m_2)$
and $(HEnc_{epk}(m))^r = HEnc_{epk}(r \odot m)$.

This embodiment may use Paillier encryption as an example of the scheme HEnc. The tokenization server 3 publishes the public key epk together with a ciphertext $Ck = HEnc_{epk}(k)$ encrypting the secret tokenization key k. The public key epk and ciphertext Ck are therefore available to all DS computers 2. System operation proceeds as in FIGS. 3a through 3c with the blinded id being computed by DS computer 2 in step 31 as $$R = (HEnc_{epk}(h_i) Ck)^N = (HEnc_{epk}(h_i) HEnc_{epk}(k))^N = HEnc_{epk}(N(h_i+k))$$

where $\odot$ corresponds to multiplication and $h_i = H(uid_i)$ and the hash function H here maps into $\mathbb{Z}_q$.

Tokenization server 3 produces the blinded token in step 36 by decrypting R using the secret key esk via the decryption algorithm HDec of the encryption scheme to obtain $$v = HDec_{esk}(R) = N(h_i+k)$$

and then computing $$R' = g^{1/v} = g^{1/N(h_i+k)}$$

as the blinded token, where g is the generator of cyclic group $\mathbb{G}$ as defined earlier. DC server 4 then unblinds the blinded token in step 40, computing $$tok_i = R'^N = g^{1/(h_i+k)}.$$

The blindly-computed deterministic function $F'(k, h_i) = g^{1/(h_i+k)}$ is a pseudorandom function as well. This scheme, where the secret tokenization key k is introduced via the ciphertext Ck used in computing the blinded id, is however less efficient than the earlier preferred embodiments.

Many other changes and modifications can of course be made to the exemplary embodiments described. For example, a keyed-hash function H may be used to compute the value $h_i$ if desired, in which case the hash key may be specific to a particular group of data sources. The value $h_i$ may also be computed as other deterministic functions of the id data $uid_i$. Moreover, while a hash function H is used above to map the $uid_i$ to the correct group for the detailed protocol described, in other embodiments the blinded id may be computed by blinding $uid_i$ per se rather than a function thereof, e.g. by choosing the $uid_i$ within a required group for protocol operation.

While a system 1 including multiple DS computers 2 has been described, the tokenization process may be used for data transmissions from a single data source in other embodiments.

In general, steps of flow charts may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data tokenization system comprising a data-source computer, a tokenization computer and a data-collection computer adapted for communication via a network, wherein:

the data-source computer provides message data, having associated id data, to be sent to the data-collection computer and is adapted to produce a blinded id by blinding said id data using a nonce, to send the blinded id to the tokenization computer, and to send the nonce and said message data via the network for receipt by the data-collection computer;

the tokenization computer is adapted, in response to receipt of said blinded id, to produce therefrom a blinded token comprising a function, blinded with said nonce, of said id data and a secret key of the tokenization computer, and to send the blinded token to the data-collection computer; and the data-collection computer is adapted, in response to receipt of said blinded token from the tokenization computer and of said nonce and said message data sent by the data-source computer, to use the nonce to unblind the blinded token to obtain an id token, comprising a deterministic function of said id data and said secret key, and to store the id token and said message data in storage operatively coupled to the data-collection computer, the data-source computer being denied access to the id token, the tokenization computer being denied access to the id data and the id token, and the data-collection computer being denied access to the id data.

2. The system as claimed in claim 1 wherein:

the data-source computer is adapted such that said blinded id comprises a value $R=F(N, h)$ where F is a predetermined function, N is said nonce and h is a function of said id data;

the tokenization computer is adapted such that said blinded token comprises a value $R'=F(k, R)$ where k is said secret key;

the data-collection computer is adapted such that said id token comprises a value F(n, R') where n is a function of said nonce N; and the predetermined function F is such that $F(n, R')=F'(k, h)$ where F' is said deterministic function.

3. The system as claimed in claim 2 wherein said predetermined function F is such that $F(x, y)=y^x$ and said function n comprises a value $N^{-1}$.

4. The system as claimed in claim 3 wherein:

the tokenization computer is further adapted to periodically generate a new secret key k', to produce token-update data Δ, comprising a value k'/k, and to send the token-update data Δ to the data-collection computer; and the data-collection computer is further adapted, in response to receipt of the token-update data Δ, to replace said id token tok in said storage by an updated token comprising a value $tok^Δ$.

5. The system as claimed in claim 2 wherein said function h comprises a hash of said id data.

6. The system as claimed in claim 1 wherein:

the data-source computer is further adapted to select a session identifier for said message data to be sent to the data-collection computer, to send the session identifier to the tokenization computer with said blinded id, and to send the session identifier, the message data and the nonce to the data-collection computer; and the tokenization computer is further adapted to send the session identifier to the data-collection computer with the blinded token.

7. The system as claimed in claim 1 wherein:

the data-source computer is further adapted to encrypt said message data and said nonce to produce encrypted data and to send the encrypted data to the tokenization computer with said blinded id;

the tokenization computer is further adapted to send said encrypted data to the data-collection computer with the blinded token; and the data-collection computer is further adapted to decrypt said encrypted data to recover the message data and the nonce.

8. The system as claimed in claim 1 including more than one said data-collection computer.

* * * * *